US009432376B2

(12) United States Patent
Wherry et al.

(10) Patent No.: US 9,432,376 B2
(45) Date of Patent: Aug. 30, 2016

(54) METHOD AND SYSTEM FOR DETERMINING AND SHARING A USER'S WEB PRESENCE

(71) Applicant: Google Inc., Mountain View, CA (US)

(72) Inventors: Elaine Wherry, San Francisco, CA (US); Sandy Jen, Mountain View, CA (US); Seth Sternberg, Palo Alto, CA (US); Jian Shen, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/569,528

(22) Filed: Dec. 12, 2014

(65) Prior Publication Data

US 2015/0150080 A1    May 28, 2015

Related U.S. Application Data

(63) Continuation of application No. 14/076,009, filed on Nov. 8, 2013, now Pat. No. 8,930,460, which is a continuation of application No. 11/772,745, filed on Jul. 2, 2007, now Pat. No. 8,595,295.

(60) Provisional application No. 60/806,347, filed on Jun. 30, 2006.

(51) Int. Cl.
*G06F 15/16* (2006.01)
*H04L 29/06* (2006.01)
(Continued)

(52) U.S. Cl.
CPC .......... *H04L 63/10* (2013.01); *G06F 17/30861* (2013.01); *H04L 67/24* (2013.01); *H04L 67/306* (2013.01); *G06F 2216/15* (2013.01)

(58) Field of Classification Search
CPC ..... H04L 29/06; H04L 67/306; H04L 67/24; H04L 63/10; G06F 2216/15; G06F 17/30861
USPC .......................................... 709/204
See application file for complete search history.

(56) References Cited

U.S. PATENT DOCUMENTS 5,721,763 A    2/1998  Joseph et al.
7,185,107 B1   2/2007  Cassar
7,502,329 B2   3/2009  Li et al.
(Continued)

FOREIGN PATENT DOCUMENTS

WO    2008005948 A2    1/2008
WO    2009149466 A1   10/2009
WO    2009149468 A1   12/2009

OTHER PUBLICATIONS

International Search Report and Written Opinion for PCT/US2007/072687, mailed on Jul. 29, 2008.
(Continued)

*Primary Examiner* — Tauqir Hussain
(74) *Attorney, Agent, or Firm* — Patent Law Works LLP (57) ABSTRACT

A method and system for determining and sharing a user's web presence have been disclosed. According to one embodiment, a computer implemented method comprises providing web presence information associated with a first user from a first computer having a first software module. The web presence in formation is received at a second computer. The web presence information is used to dynamically inform a second user communicating with the second computer of a website that the first user is viewing.

20 Claims, 5 Drawing Sheets

(51) Int. Cl.
*G06F 17/30* (2006.01)
*H04L 29/08* (2006.01)

(56) References Cited

U.S. PATENT DOCUMENTS

| | | | |
|---|---|---|---|
| 7,587,450 | B2 | 9/2009 | Morris |
| 7,626,937 | B2 | 12/2009 | Chen |
| 7,640,306 | B2 | 12/2009 | Appelman et al. |
| 7,676,574 | B2 | 3/2010 | Glommen et al. |
| 7,693,934 | B2 | 4/2010 | Jung |
| 7,693,984 | B2 | 4/2010 | Bashford et al. |
| 7,853,881 | B1 | 12/2010 | Aly Assal et al. |
| 7,904,500 | B1 | 3/2011 | Anderson |
| 7,925,549 | B2 | 4/2011 | Looney et al. |
| 8,046,259 | B1 | 10/2011 | Siegel et al. |
| 2002/0095336 | A1 | 7/2002 | Trifon et al. |
| 2003/0001846 | A1 | 1/2003 | Davis et al. |
| 2003/0018747 | A1* | 1/2003 | Herland ............... A63F 13/12 709/218 |
| 2003/0126213 | A1 | 7/2003 | Betzler |
| 2003/0195801 | A1 | 10/2003 | Takakura et al. |
| 2004/0088155 | A1 | 5/2004 | Kerr et al. |
| 2004/0117443 | A1 | 6/2004 | Barsness |
| 2004/0215708 | A1 | 10/2004 | Higashi et al. |
| 2005/0086605 | A1* | 4/2005 | Ferrer ............... G06Q 30/02 715/745 |
| 2005/0108392 | A1 | 5/2005 | Glasser et al. |
| 2005/0114204 | A1 | 5/2005 | Kim et al. |
| 2005/0131992 | A1 | 6/2005 | Goldstein et al. |
| 2005/0266835 | A1 | 12/2005 | Agrawal et al. |
| 2006/0074769 | A1* | 4/2006 | Looney ............... G06Q 30/02 705/14.66 |
| 2006/0095530 | A1 | 5/2006 | Daniell et al. |
| 2006/0116139 | A1 | 6/2006 | Appelman |
| 2007/0006089 | A1 | 1/2007 | Bales et al. |
| 2007/0094732 | A1 | 4/2007 | Mood et al. |
| 2007/0143439 | A1 | 6/2007 | Szabo et al. |
| 2007/0203917 | A1 | 8/2007 | Du et al. |
| 2007/0220106 | A1 | 9/2007 | Reisman |
| 2007/0234226 | A1 | 10/2007 | Szeto |
| 2007/0281607 | A1 | 12/2007 | Bucher et al. |
| 2007/0282621 | A1 | 12/2007 | Altman et al. |
| 2008/0034040 | A1 | 2/2008 | Jen et al. |
| 2008/0091517 | A1 | 4/2008 | Koonce et al. |
| 2009/0307082 | A1 | 12/2009 | Raghunathan et al. |
| 2009/0307089 | A1 | 12/2009 | Binnewies |
| 2009/0307325 | A1 | 12/2009 | Szeto |
| 2010/0070899 | A1 | 3/2010 | Hunt et al. |

OTHER PUBLICATIONS

Webpages downloaded from http://www.yoono.com/, printed on Sep. 10, 2009, 15 pages.

International Preliminary Report on Patentability for Application No. PCT/US2007/072687, mailed on Jan. 15, 2009, 5 pages.

International Search Report and Written Opinion of the International Searching Authority for Application No. PCT/US2009/046651, mailed on Jul. 23, 2009, 6 pages.

International Search Report and Written Opinion of the International Searching Authority for Application No. PCT/US2009/046653, mailed on Jul. 21, 2009, 7 pages.

International Search Report and Written Opinion of the International Searching Authority for Application No. PCT/US2009/046663, mailed on Dec. 30, 2009, 7 pages.

International Preliminary Report on Patentability for Application No. PCT/US2009/046651, mailed on Dec. 6, 2010, 4 pages.

International Preliminary Report on Patentability for Application No. PCT/US2009/046653, mailed on Dec. 6, 2010, 5 pages.

International Preliminary Report on Patentability for Application No. PCT/US2009/046663, mailed on Dec. 6, 2010, 6 pages.

Non-Final Office Action for U.S. Appl. No. 12/480,622, mailed on Dec. 22, 2010, 11 pages.

IBM TDB, "Advertising System for Electronic Chat Environments," ip.com, Prior Art Database, Technical Disclosure, Original Publication Date Aug. 18, 2002, ip.com Electronic Publication Date Jun. 21, 2003, 7 pages.

Final Office Action for U.S. Appl. No. 12/480,622, mailed on Sep. 7, 2011, 16 pages.

Non-Final Office Action for U.S. Appl. No. 12/558,304, mailed on Aug. 19, 2011, 11 pages.

Non-Final Office Action for U.S. Appl. No. 12/480,643, mailed on Jul. 8, 2011, 13 pages.

Non-Final Office Action for U.S. Appl. No. 12/480,671, mailed on Jul. 20, 2011, 12 pages.

Final Office Action for U.S. Appl. No. 12/480,671, mailed Dec. 1, 2011,17 pages.

Final Office Action for U.S. Appl. No. 12/558,304, mailed Jan. 19, 2012,14 pages.

Final Office Action for U.S. Appl. No. 12/480,643, mailed Jan. 23,2012, 15 pages.

Advisory Action U.S. Appl. No. 12/480,671, mailed Feb. 16, 2012, 3 pages.

* cited by examiner

METHOD AND SYSTEM FOR DETERMINING AND SHARING A USER'S WEB PRESENCE

CROSS REFERENCE TO RELATED APPLICATIONS

This application is a continuation of and claims priority to U.S. application Ser. No. 14/076,009, filed Nov. 8, 2013, titled "Method and System for Determining and Sharing a User's Web Presence," which is a continuation of and claims priority to U.S. application Ser. No. 11/772,745, filed Jul. 2, 2007, titled "A Method and System for Determining and Sharing a User's Web Presence," which claims priority to U.S. application Ser. No. 60/806,347, filed Jun. 30, 2006, titled "A Method and System for Determining and Sharing a User's Web Presence," the entireties of which are herein incorporated by reference.

TECHNICAL FIELD

The field of the invention relates generally to computer systems and more particularly relates to a method and system for determining and sharing a user's web presence.

BACKGROUND

Instant Messaging (sometimes referred to as IM) enables users to easily see whether a chosen buddy (e.g., a friend, colleague, co-worker or the like) is connected to the Internet and, if so, to exchange messages with them. Instant Messaging differs from common e-mail in the immediacy of the message exchange. Typically, IM exchanges are text-only. However, some services (e.g., AOL instant Messaging) enable voice messaging and file sharing. In IM, both users need to subscribe to the service (e.g., and have certain software on their user devices), and need to be online at the same time. In addition, the intended recipient needs to be willing to accept instant messages. If one tries to send an IM to someone who is not online, or who is not willing to accept Instant Message, a notification is typically provided that the transmission cannot be completed. If the recipient's online software is set to accept Instant Messages, it typically alerts the recipient with a distinctive sound and displays a Pop-Up window that indicates that an IM has arrived, and that enables the recipient to accept or reject it, or displays a Pop-up window containing the incoming message. In general, IM can be truly or virtually instantaneous (with, e.g., delays of usually less than a number of seconds), such that it is typically possible for two people to have a real-time online "conversation" by sending IMs to each other.

IM users typically use a networked computer and IM client software to exchange messages with one another in conversational style. An IM client provides an interface for users to compose, send, receive, and read text messages. Examples of IM clients that are popular today include IBM's SAMETIME, MSN MESSENGER, YAHOO! INSTANT MESSENGER, and AOL INSTANT MESSENGER.

In a graphical display, an IM client provides windows through which a user can compose and read messages, IM clients provide users the ability to manage lists of contacts, particularly other IM users. These lists are referred to as "buddy lists." Users may organize buddy lists into groups of related users, where the IM client displays the various groups in a hierarchical tree that can be collapsed and expanded as the user desires.

SUMMARY

A method and system for determining and sharing a user's web presence have been disclosed. According to one embodiment, a computer implemented method comprises providing web presence information associated with a first user from a first computer having a first software module. The web presence information is received at a second computer. The web presence information is used to dynamically inform a second user communicating with the second computer of a website that the first user is viewing.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the teachings herein.

BRIEF DESCRIPTION OF THE DRAWINGS

The accompanying drawings, which are included as part of the present specification. Illustrate the presently preferred embodiment of the present invention and together with the general description given above and the detailed description of the preferred embodiment given below serve to explain and teach the principles of the present invention.

DETAILED DESCRIPTION

A method and system for determining and sharing a user's presence are disclosed. According to one embodiment, a computer implemented method comprises providing web presence information associated with a first user from a first computer having a first software module. The web presence information is received at a second computer. The web presence information is used to dynamically inform a second user communicating with the second computer of a website that the first user is viewing.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium. such as, but is not limited to any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invent ion as described herein.

Figure 1:
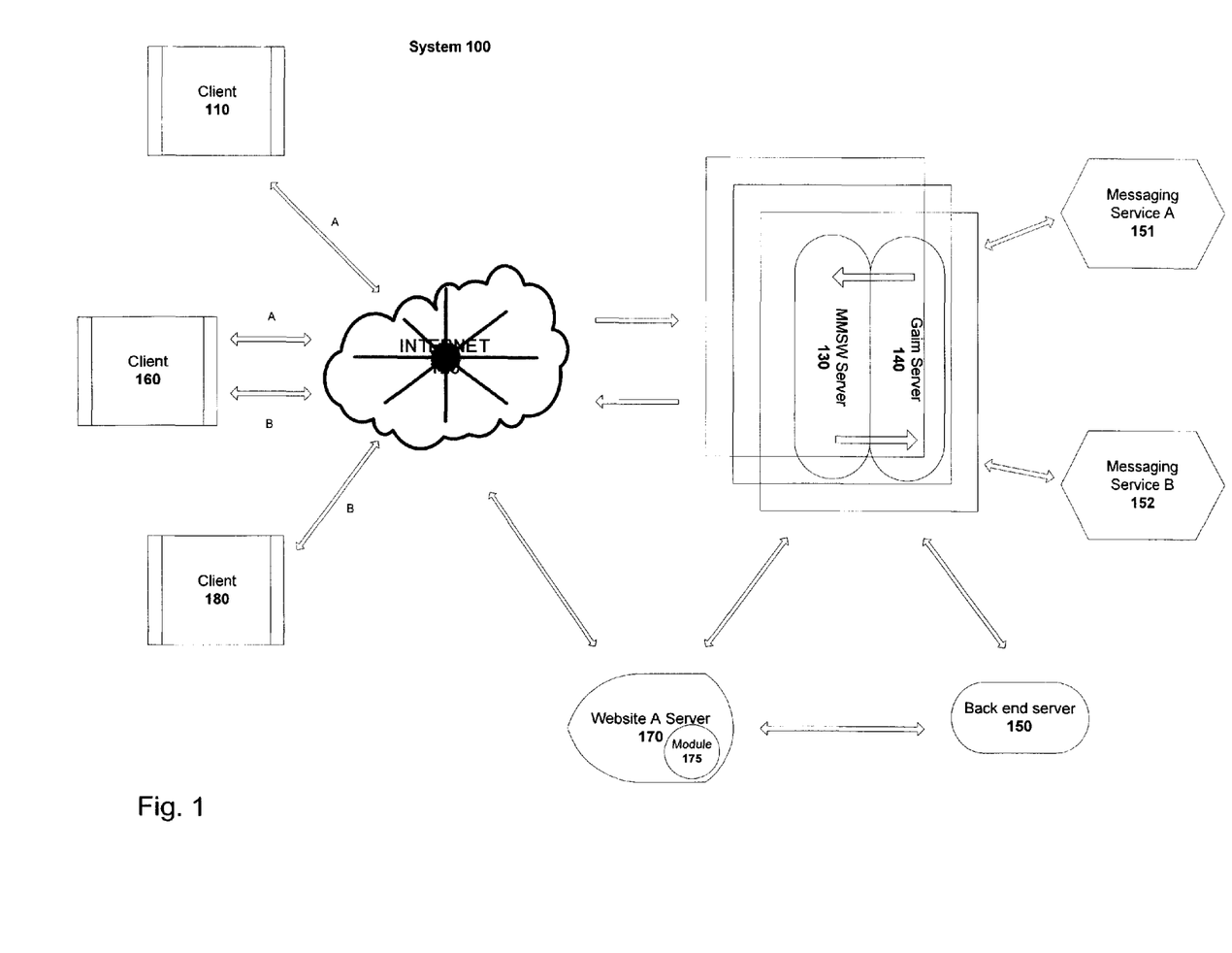
FIG. 1 illustrates a block diagram of an exemplary peer-Io-peer messaging system with web presence, according to one embodiment.

FIG. 1 illustrates a block diagram of an exemplary system for peer-la-peer instant messaging with web presence capabilities, according to one embodiment. Web presence refers to identifying the website that a user is visiting on the web and/or the activities, behavior, or other information related to that user while the user is on that site. For example, a user may be surfing the CNN website reading news—accordingly, this user's web presence is on CNN's website. Additionally, a user may have multiple browser windows open and be surfing multiple websites at the same time. A user may also have multiple tabs open in one browser window, such as in programs like FIREFOX. In these situations, it is possible to designate an active browser or an active tab as the website where a user is present, or that the user is present on all websites simultaneously.

System 100 includes clients 110, 160, and 180, a multiple messaging service web (MMSW) server 130, messaging service web servers 151 and 152, a website server 170 with software module 175, a Gaim server 140, and one or more back end servers 150. System 100 is interconnected by Internet 120. According to one embodiment, network 120 is described as being the Internet, alternatively, the network 120 may be a Wide Area Network (WAN), a Local Area Network (LAN), or any other system of interconnections enabling two or more devices to exchange information. Further, the network 120 may include a wireless network, such that one or more of clients 110 or 160 may be wireless devices.

One or more of clients 110, 160, or 180 may allow network access via a web browser such as MICROSOFT'S INTERNET EXPLORER, NETSCAPE BROWSER, MOZILLA, FIREFOX, or the SAFARI browsers that support HTML and JavaScript. Additionally, clients 110, 160, or 180 may be mobile devices, such as videophones, laptops, smart phones, mobile phones, PDAs, game devices such as the PSP manufactured by Sony Electronics, multimedia devices such as iPods and iPhones manufactured by Apple Computers of Cupertino, Calif., or similar devices.

According to one embodiment, server 140 may be a Gaim server such as an open-source GTK2-based instant messenger application (under GPL). It supports multiple protocols via modules, including AIM, ICQ, Yahoo!, MSN, Jabber, IRC, Napster, Gadu-Gadu and Zephyr. Gaim server 140 allows clients to log in to multiple accounts on multiple instant messaging (IM) networks simultaneously. This means that one can be chatting with friends on AOL Instant Messenger, talking to a friend on Yahoo Messenger, and sitting in an IRC channel all at the same time, and through a common web interface.

Gaim server 140 runs on a number of platforms, including Windows, Linux, and Qtopia (Sharp, Zaurus and iPaq). Gaim server 140 is not endorsed by or affiliated with AOL TimeWarner, Microsoft, or Yahoo. Although Gaim server 140 is described, any multi-protocol server may be used including Pidgin (open source) or Trillian created by Cerulean Studios. According to one embodiment, Gaim server 140 does not include the GTK visual software in order to be optimized as a web server application. In one embodiment, the Gaim server 140 is comprised mostly of back-end functionality and no graphical user interface. Different systems may set limits on how many instant messaging services may be connected, or may be active on one screen.

Messaging service web servers 151 and 152 are instant messaging servers. For example, messaging service web server 151 may enable AOL Instant Messenger and messaging service web server 152 may enable Yahoo! Instant Messenger, Gaim server 140 communicates with messaging service web servers 151 and 152 to allow client 160 to log in to two or more accounts on multiple IM networks simultaneously. Client 160 can be communicating with client 110 through messaging service A and communicating with client 180 through messaging service B. More than two messaging services may be included. More than three clients may be included in the system. Each client may communicate with multiple clients using multiple messaging services.

The processes executed within system 100 may be implemented in software or hardware, or utilizing a device that is, or can be, connected to a common network, such as the Internet. Clients 110, 160, 180 may be mobile devices or fixed devices such as set top boxes, desktop computers, media recorders such as those manufactured by TiVo, Inc. of Alviso, Calif., game devices such as the XBox manufactured by Microsoft, Corp. of Redmond, Wash. or similar devices.

Multiple messaging service web server (MMSW server) 130 enables a web based instant messaging service for clients 110, 160, and 180 that does not require IM software to be installed on clients 110, 160, and 180. According to one embodiment, the instant messaging application is web-based and communication between clients 110, 160, 180 and MMSW server 130 take the form of XmlHttpRequests. MMSW server 130 includes the ability to efficiently query and receive information from Gaim server 140 in the form of new events for clients 110, 160, and 180.

MMSW server 130 is a web server that uses any one of a number of protocols and/or applications including Hyper-Text Transfer Protocol (HTTP), File Transfer Protocol (FTP), Internet Relay Chat (IRC), etc. via a TCP/IP connection (not shown in this view) or other similar connection protocols. The operating system may be Windows®, UNUX, SUN Solaris®, Mac OS, Tiger, or other similar operating system. In one embodiment the MMSW server 130 is a dedicated server. It uses processing logic, tools and databases and is built using a combination of technologies such as those from Apache Software (www.apachc.org) such as Tomcat servers; Java based technologies such as J2EE, EJB, JBOSS, JDBC; and/or databases such as MySQL.

System 100 also includes a website server 170 that may host a website, such as CNN or Yahoo!. Server 170 is also connected with the internet 120. Server 170 includes software module 175 that detects whether registered users of MMSW server 130 are surfing content on website(s) hosted by server 170. Server 170 may communicate with MMSW server 130 with information such as a user's web presence on website server 170. System 100 may include multiple servers similar to website server 170 that hosts various websites.

System 100 may also include other supporting computing software and hardware, for example, additional website servers, databases, computers, and user interface servers.

Figure 2:
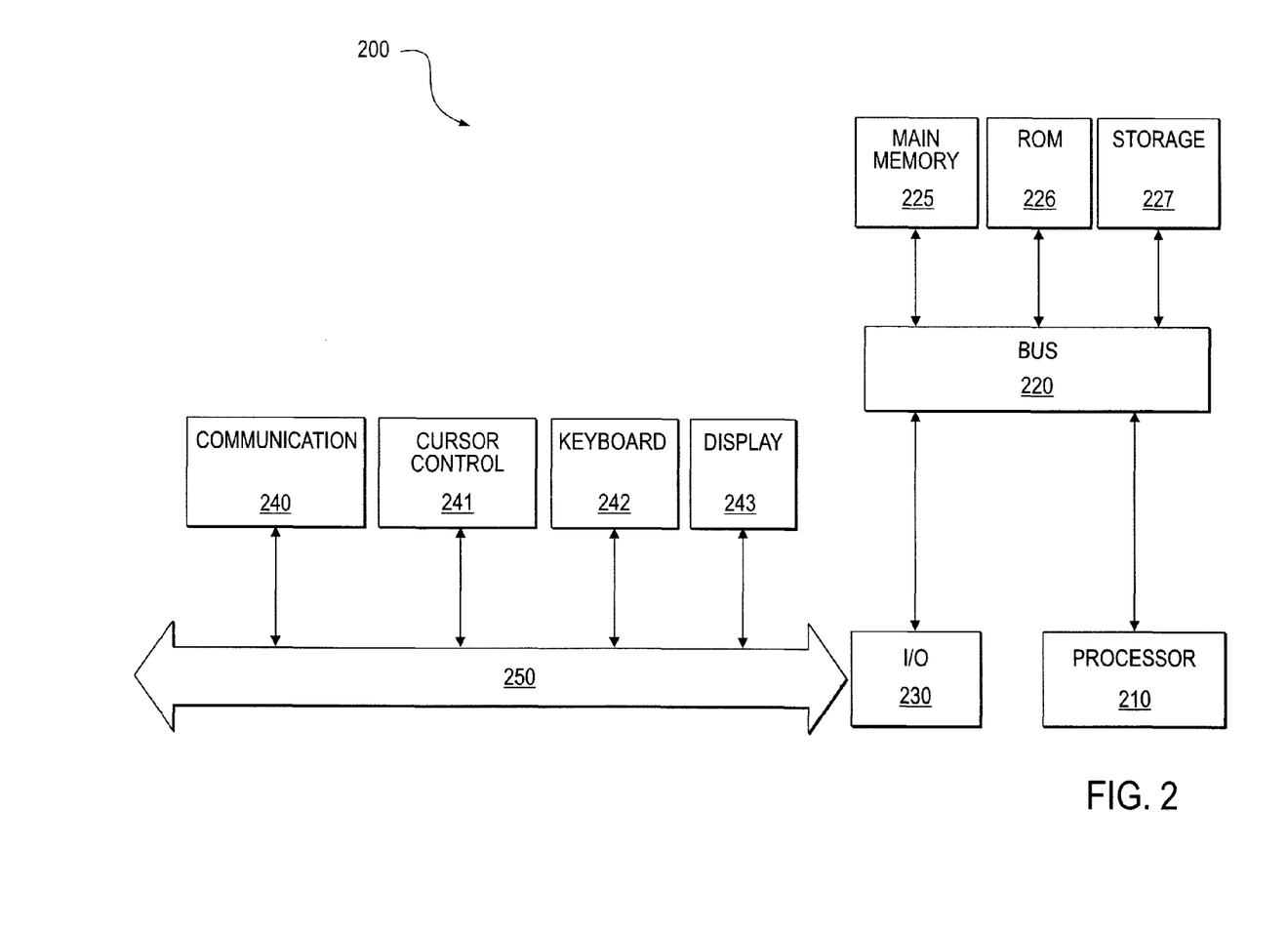
FIG. 2 illustrates an exemplary computer architecture for use with the present system, according to one embodiment.

FIG. 2 illustrates an exemplary computer architecture for use with the present system, according to one embodiment. Computer architecture 200 can be used to implement a client 110, 160, 180, or a server 130, 140, 151-152, and 170 of FIG. 1. One embodiment of architecture 200 comprises a system bus 220 for communicating information, and a processor 210 coupled to bus 220 for processing information. Architecture 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Architecture 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Architecture 200 can also be coupled to a second I/O bus 250 via an I/O interface 230. A plurality of 110 devices may be coupled I/O bus 250, including a display device 243, an input device (e.g., an alphanumeric input device 242 and/or a cursor control device 241). For example, web pages rendered by MMSW server 130 and related information may be presented to the user on the display device 243.

The communication device 240 allows for access 10 other computers (servers or clients) via a network. The communication device 240 may comprise a modem. a network interface card, a wireless network interface or other well known interface device, such as those used for coupling to Ethernet, token ring, or other types of networks.

Figure 3:
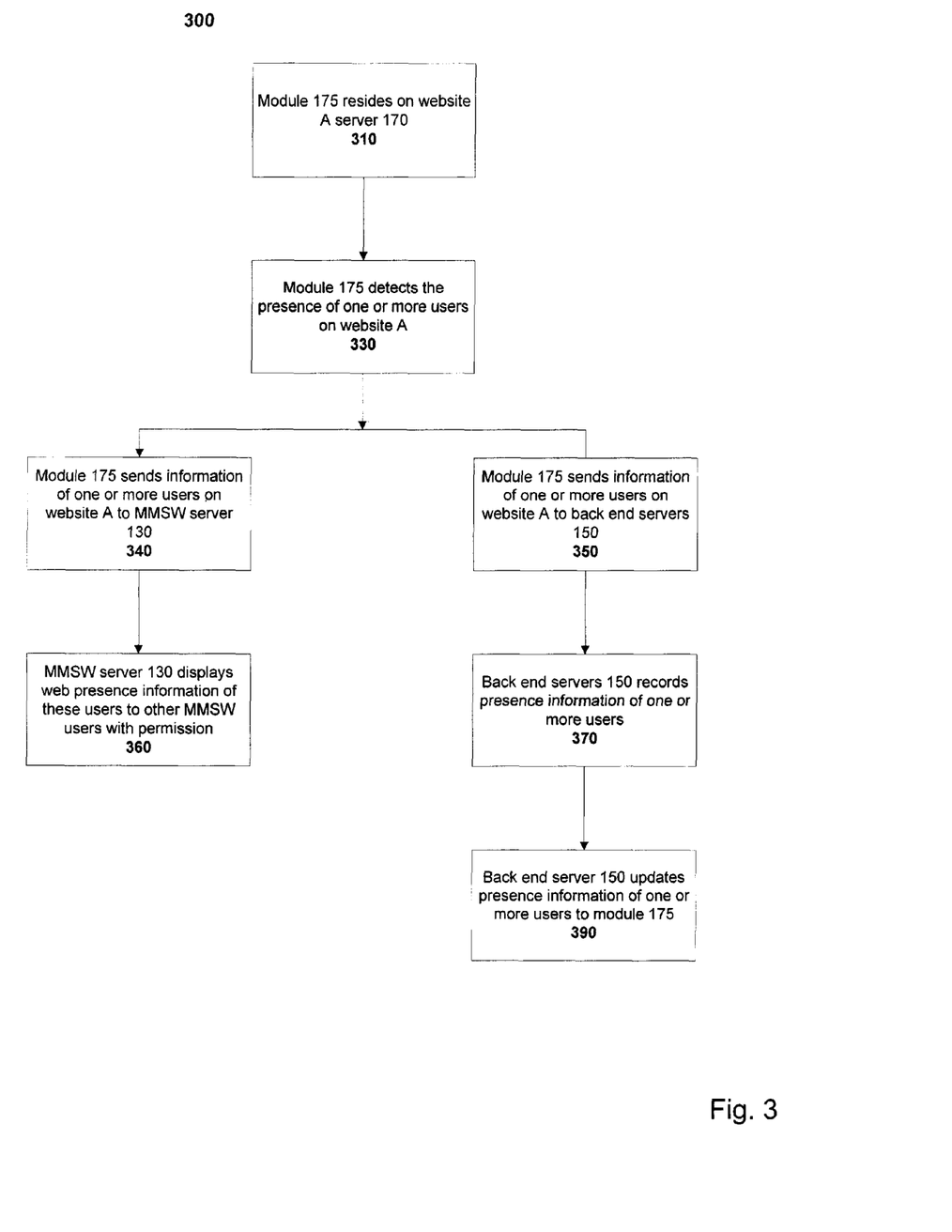
FIG. 3 illustrates a flow diagram of an exemplary process for determining and sharing a user's web presence with other users, according to one embodiment.

FIG. 3 illustrates a flow diagram of an exemplary process 300 for determining and sharing a user's web presence, according to one embodiment. Website server 170 may be a web server providing access to various websites, for example CNN.com. A web presence software module 175 exists on website server 170 (310). The software code may be an embedded The detection of a user's presence may also be accomplished in ways other than using module 175. For example, client 110 may contain a cookie with a user's MMSW identification information. Server 170 may contain a software program to request and/or detect such cookies. The MMSW identification information may be in the form of login name, account number, nickname, e-mail address, instant message ID, or similar identification.

One such Flash embodiment includes using the Local-Connection Objects in Flash to interact between SWF files. The LocalConnection class allows sending and receiving of data from one SWF to another across sites. Cross-domain communication is enabled through commands such as LocalConnection.allowDomain( ). Sites that include this Flash script communicates with the intended domain to transfer information.

A JavaScript embodiment includes dynamically embedding a script tag on a page. By dynamically inserting a script tag on a page, the JavaScript is run immediately. The script tag references scripts on other sites. To facilitate communication between the dynamically embedded script and the other domain, the included script outputs a JSON (or any other predetermined format) response to the data contained in the URL of the script tag.

A third embodiment includes a downloaded and installed software application, like a browser plug-in, where the installed application affords a greater range of functionality than a stand-alone browser normally allows. The application may be an installed extension of the browser like a Mozilla Add-on, or a separate application altogether like an Adobe AIR application. Once a user installs such a plug-in or similar application, the installed software has the ability to detect what website a user is browsing and communicate that and similar information to back-end server 150 via a protocol like HTTP or another Internet protocol.

Another embodiment involves embedding a small program, perhaps in Java, called an applet onto pages served by website server 170 using the <applet> tag. The applet is downloaded every time the user visits the page and the code is executed by software on the user's computer, which can be the Java Virtual Machine, etc. When the code is executed, the applet is able to garner pertinent information which can then be communicated back to back-end server 150 via HTTP or another Internet protocol.

In yet another embodiment, a browser in a frame may be used for detecting and sharing a user's web presence. For example, a user may first log into MMSW server 130. Website A 170 may include a web browser within a frame. Because the web traffic passes through website A 170. It is always known where the user surfs on the Internet. Cookies may be used to detect the presence of users.

The web presence software module 175 allows information to be passed between MMSW Server 130 and website server 170. The information may include URLs, IP addresses of users of website server 170, and any other similar information collected by website server 170.

Module 175 detects the presence of one or more users on web site A (330). If a user happens to be a registered user of a particular website, web presence module 175 may communicate the registered user's profile information and web presence in formation to MMSW server 130. If a user is not a registered user, web presence module 175 may communicate web presence information to MMSW server 130 by treating the user as a temporary user having a temporary identification (340). Web presence information communicated between MMSW server 130 and web presence module 175 may include a MMSW user 10, duration of visit, the sub pages of web site A visited by a MMSW users, the URL of the web page visited, the name of the web site. The icon or representative image of the web site visited, etc.

MMSW server 130 displays the web presence information of the users on website A 170 to other MMSW users (360). Each user may have the option of allowing its web presence information to be displayed to only certain users. For example, when a user on website server 170 is registered, only his/her buddies are allowed to see the user's web presence information during an IM session being provided by MMSW server 130. Web presence information may also be restricted to those users who have been granted certain levels of access to the user's web presence information by the user. When the information is displayed, it may appear next to the buddy name on a user's buddy list as an icon, URL, or title of web site A. For example, if the user is surfing cnn.com, then the display may be CNN, www.cnn.com, or CNN's popular icon etc.

Web presence module 175 may also send web presence information of users surfing website A 170 to back end servers 150 (350). The back end servers 150 record the presence information of users, preferably in a database (370). The back end servers 150 periodically analyze the web presence information of users on website A 170, and update metrics related to the web presence information (390). The information updated may include the number of users who are on website A 170, the duration of their stay, and which sub pages they have been visiting.

A user may be able to limit the types of web sites from which web presence information is detected and shared. For example, a user may only allow the detect ion and sharing of web presence information when he is on non-secure web sites such as CNN news, but not when he is on his online banking websites. The limitation may be set by maintaining a preference panel available through MMSW server 130, where the user may turn off permission to share web presence information of any web site he/she visits at any time.

Figure 4:
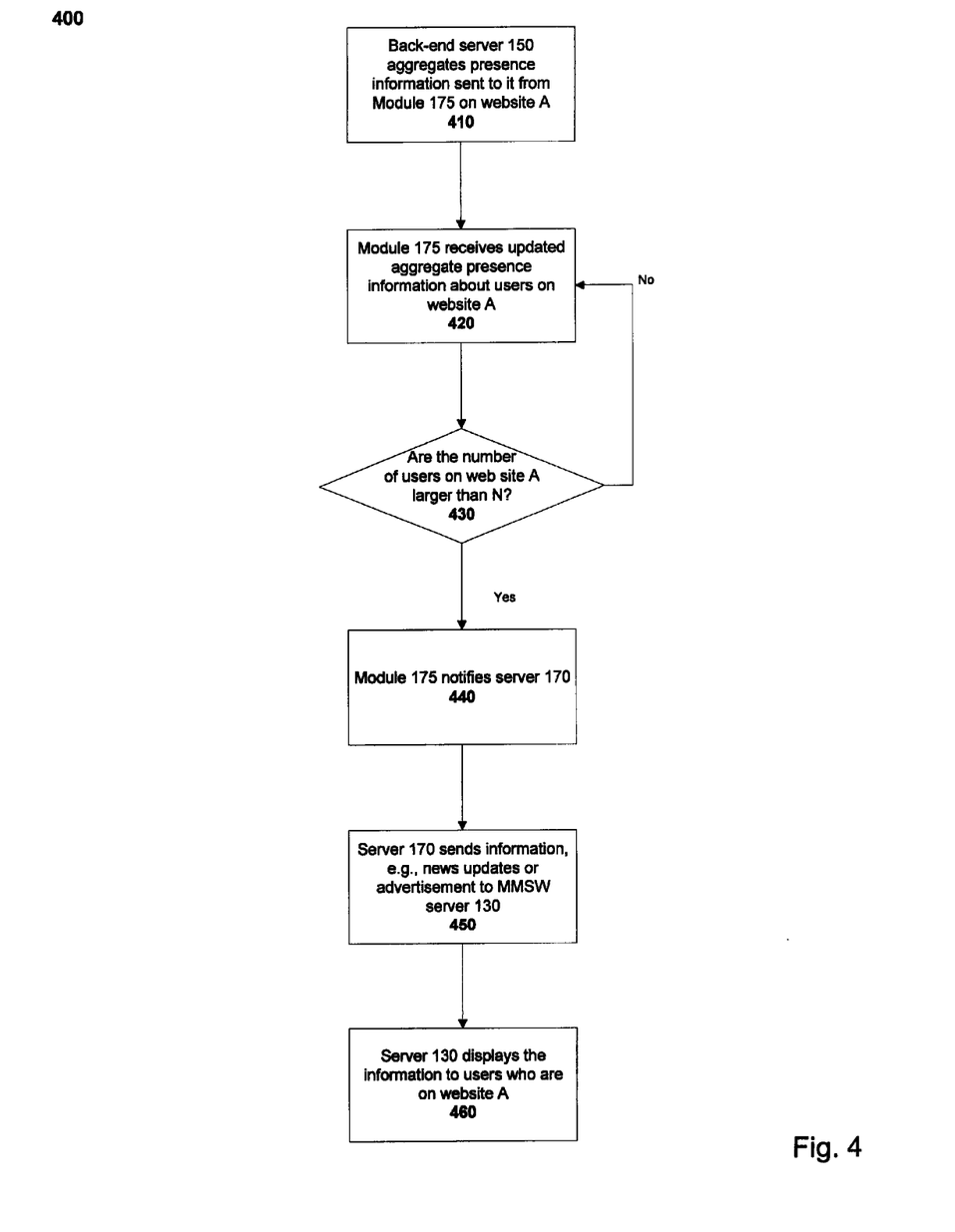
FIG. 4 illustrates a flow diagram of an exemplary process for feeding targeted information to users, according to one embodiment.

FIG. 4 illustrates a flow diagram or an exemplary process 400 for feeding targeted information to users, according to another embodiment. As web presence module 175 collects web presence information for each user of website A 170, the web presence information is provided to back-end server 150. Back end server 150 aggregates the web presence information to generate statistics that may be used for targeted advertising (410). For example, web presence module 175 may receive a statistic generated by back-end server 150 aggregating web presence information from website A (420). If a number of users on website A 170 is larger than a predetermined number N (430), certain actions may be taken. If the answer is Yes, web presence module 175 may notify website A server 170 of this information (440). Server 170 may send targeted information for users to MMSW server 130 (450). The information sent can be determined by the number of users on website A. the duration of stay, the sub pages the users have visited, etc. The information may be news updates of a special category, e.g., sports. The information may also be an advertisement. Server 130 may then correspondingly display similar information to those users who are on or have been on website A (460). It may display the information in the form of RSS feed, pop-up windows, instant messages, lines in chat rooms, emails, etc.

Figure 5:
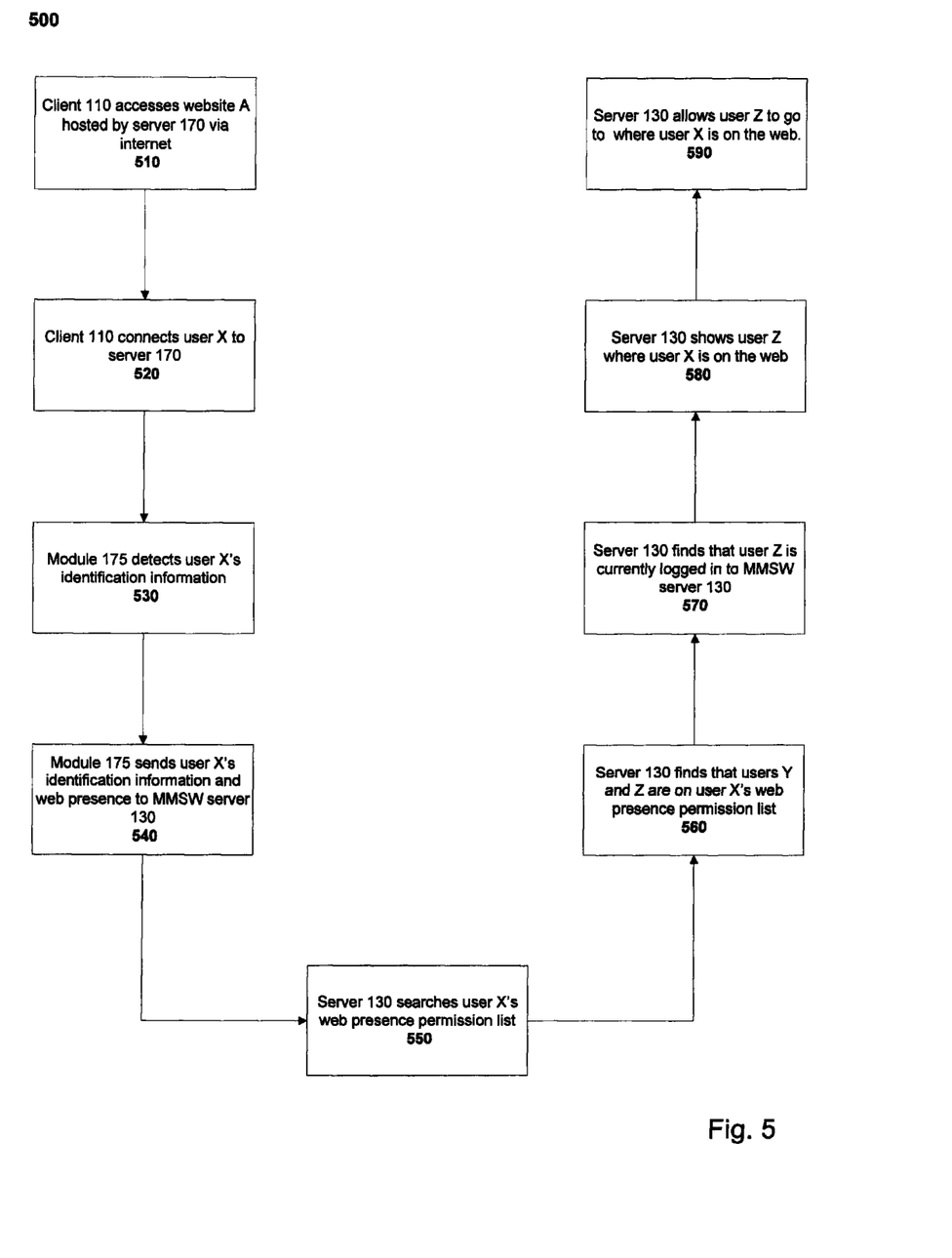
FIG. 5 illustrates a flow diagram of an exemplary process for sharing a user's web presence, according to one embodiment.

FIG. 5 illustrates a flow diagram of an exemplary process 500 for sharing a user's web presence. According to one embodiment, Process 500 specifically demonstrates how MMSW server 130 works with web presence module 175 to share the web presence information of a first user to a second user. In one embodiment, client 110 accesses website A hosted on server 170 via the internet (510). Client 110 connects user X to server 170 (520). Module 175 detects the presence of any users with a MMSW account (530) as described above.

In alternate embodiments, login information (e.g., user identification and preference information stored in a cookie) for one or more outside website(s) may have been previously entered and stored in the MMSW server 130. When a user accesses a website hosted on server 130, the login process for another website may be processed automatically through the server 130. It is also possible that server 130 may prompt the user to login to additional websites' servers, listing all the options, either provided by the server or pre-selected by the user. Then the user may choose the ones it wants to log in to through server 130. In another embodiment, log in options can be embedded in the MMSW website, and a MMSW user may go there anytime to request logging in to any other websites of choice.

Alternatively, server 170 may also simultaneously login user X 10 website A's server 170 and MMSW Server 130, or provide options for user X to login 10 MMSW server 130 from server A's 170 website. For example, the login information for MMSW server 130 may have been previously entered and stored in server 170. When a user logs in to server 170, the log in process for MMSW server 130 may be processed automatically through the server 170. It is also possible that server 170 may prompt the user to log in to other websites listing all the options, either provided by the server or pre-selected by a user. Then the user may choose the websites he wishes to log in to through server 170, one of which could be the website hosted by MMSW server 130. In another embodiment log in options can be embedded in a website other than MMSW server 130, and a user for that website may go there anytime to request logging in to a website of choice, such as the MMSW website.

After user X's presence on website A hosted by server 170 is detected, server 170 sends user X's MMSW identification information to MMSW server 130 and; accordingly, this allows server 130 learn that X is on website A (540). For example, if server 170 is the server for CNN.com, server 170 may send user X's information and its web presence on CNN.com to server 130 (540). On Server 130, each MMSW account holder owns buddy lists and grants buddies different levels of visibility to his/her web presence. User X may have a web presence permission list which allows some buddies to see where X is on the internet. The web presence permission list may contain names, nick names, or e-mail addresses of other users that user X would like to share certain type of information, such as user X's web presence. This list may be for web presence only or in combination with sharing of other information, such as graphics or keystrokes. The list may be turned on or off by user X at any time.

After receiving user X's web presence information on website A from server 170, server 130 searches user X's web presence permission list on server 130 (550). Server 130 may find that users Y and Z are on user X's web presence list (560). The list may contain many people.

In another embodiment, server 130 may not maintain permission lists, but ties this feature to users' privilege levels. Sever 130 may enable any user to assign a privilege level to another user to access information owned or related to the first user.

If a permission list is used, server 130 may search the list and find that some of the users on the permission list are currently active (570). For example, server 130 can detect that user Z is Jogged in and actively using MMSW server and user Y is not Server 130 shows user Z user X's web presence by sending such information to client 180 (580). Web presence may be provided in many ways. For example, an icon for a popular website may appear next to user X's name on user Z's screen, such as a "Y!" for "Yahoo." It may also show the name of a website in its usually known name, such as "Yahoo," or by a hyperlink www.yahoo.com which may appear when a mouse pointer moves over an icon. User Z may receive an e-mail, instant message, text message or other method of notification of X's web presence. A user may choose one or more ways to notify another user his/her web presence. A user may choose one or more ways to be notified of another user's web presence.

Server 130 may allow user Z to go to where user X is on the web (590). There are many ways this may be accomplished. For example, user Z may click on the icon, the name or the hyperlink. Server 130 may also create a button next to the icon representing user X in user Z's buddy list. With the language "Meet me there!" By clicking this button, Z will go to a website where X is. This can be very useful when X and Z are chatting by instant messaging online, and X sends a message to Z saying "check this out!" Instead of X sending Z a hyperlink or anything else, Z can just look at where X is and go there. Z can go there by typing the address into the browser, clicking the icon or button on the buddy list that embeds a hyperlink, or a new browser window can be launched automatically with that hyperlink loaded.

Sharing a user's web presence is not limited to a system or process of instant messaging. The present method and system is applicable to e-mail systems, social networking or dating websites, or a user's own website or blog page. A user may send an e-mail to a friend and the e-mail is embedded with the information of the user's web presence. The friend may then go where the user is. A user of a social networking or dating website may be browsing other users' profiles and sharing what he/she sees with friends by providing friends with his/her web presence. A user may have his/her own website or blog page. This user may invite many friends to his website or blog page. The user may allow his friends to see where he is on the website. It is also applicable if a user opens multiple browser windows or tabs and shares a user's multiple web presence with other users.

A method and system for determining and sharing a user's web presence has been described. It is understood that the embodiments described herein are for the purpose of elucidation and should not be considered limiting the subject matter of the present patent. Various modifications, uses, substitutions, combinations, improvements, methods of productions without departing from the scope or spirit of the present invention would be evident to a person skilled in the art.

We claim:

1. A method, comprising:
   determining, with one or more processors, presence information of users visiting an application;
   determining, with the one or more processors, whether a number of users visiting the application satisfies a threshold number of visits to the application using the presence information;
   responsive to satisfying the threshold, retrieving, with the one or more processors, targeted information from a third party providing the application; and
   transmitting, with the one or more processors, an instruction to a device that causes the device to display the targeted information to at least one of the users visiting the application, the targeted information being displayed within a graphical element on the device.

2. The method of claim 1, wherein determining whether the number of users visiting the application satisfies the threshold includes generating presence statistics using the presence information, the presence statistics including a duration of the at least one user on the application.

3. The method of claim 1, wherein determining the presence information of the users visiting the application includes identifying behavior of the users while the users are visiting the application.

4. The method of claim 1, wherein determining the presence information of the users includes retrieving a designation of an active browser associated with the application the users are visiting.

5. The method of claim 1, wherein providing the targeted information includes determining whether the users are currently active on the application.

6. The method of claim 1, wherein the targeted information includes at least one of from the group of an RSS feed, a pop-up window, an instant message and an email.

7. The method of claim 1, wherein determining the presence information of the users includes restricting the presence information of the users from being associated with a secure application.

8. A computer program product comprising a non-transitory computer useable medium including a computer readable program, wherein the computer readable program when executed on a computer causes the computer to:
   determine presence information of users visiting an application;
   determine whether a number of users visiting the application satisfies a threshold number of visits to the application using the presence information;
   responsive to satisfying the threshold, retrieve targeted information from a third party providing the application; and
   transmit an instruction to a device that causes the device to display the targeted information to at least one of the users visiting the application, the targeted information being displayed within a graphical element on the device.

9. The computer program product of claim 8, wherein the determination of whether the number of users visiting the application satisfies the threshold includes generating presence statistics using the presence information, the presence statistics including a duration of the at least one user on the application.

10. The computer program product of claim 8, wherein the determination of the presence information of the users visiting the application includes identifying behavior of the users while the users are visiting the application.

11. The computer program product of claim 8, wherein the determination of the presence information of the users includes retrieving a designation of an active browser associated with the application the users are visiting.

12. The computer program product of claim 8, wherein provision of the targeted information includes determining whether the users are currently active on the application.

13. The computer program product of claim 8, wherein the targeted information includes at least one of an RSS feed, a pop-up window, an instant message and an email.

14. The computer program product of claim 8, wherein the determination of the presence information of the users includes restricting the presence information of the users from being associated with a secure application.

15. A system comprising:
   a processors; and
   a memory storing instructions that, when executed, cause the system to:
      determine presence information of users visiting an application;
      determine whether a number of users visiting the application satisfies a threshold number of visits to the application using the presence information;
      responsive to satisfying the threshold, retrieve targeted information from a third party providing the application; and
      transmit an instruction to a device that causes the device to display the targeted information to at least one of the users visiting the application, the targeted information being displayed within a graphical element on the device.

16. The system of claim 15, wherein the determination of whether the number of users visiting the application satisfies the threshold includes generating presence statistics using the presence information, the presence statistics including a duration of the at least one user on the application.

17. The system of claim 15, wherein the determination of the presence information of the users visiting the application includes identifying behavior of the users while the users are visiting the application.

18. The system of claim 15, wherein the determination of the presence information of the users includes retrieving a designation of an active browser associated with the application the users are visiting.

19. The system of claim 15, wherein provision of the targeted information includes determining whether the users are currently active on the application.

20. The system of claim 15, wherein the determination of the presence information of the users includes restricting the presence information of the users from being associated with a secure application.

* * * * *